(12) United States Patent
Sobolevskiy et al.

(10) Patent No.: US 7,988,940 B2
(45) Date of Patent: Aug. 2, 2011

(54) SELECTIVE CATALYTIC REDUCTION SYSTEM AND PROCESS FOR TREATING NOX EMISSIONS USING A ZINC OR TITANIUM PROMOTED PALLADIUM-ZIRCONIUM CATALYST

(75) Inventors: Anatoly Sobolevskiy, Orlando, FL (US); Joseph A. Rossin, Columbus, OH (US); Michael J. Knapke, Columbus, OH (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/773,057

(22) Filed: May 4, 2010

(65) Prior Publication Data

US 2010/0303697 A1 Dec. 2, 2010

Related U.S. Application Data

(63) Continuation-in-part of application No. 12/472,633, filed on May 27, 2009, now Pat. No. 7,744,840, which is a continuation-in-part of application No. 12/122,116, filed on May 16, 2008, now Pat. No. 7,718,153.

(51) Int. Cl.
B01D 53/56 (2006.01)
B01D 53/74 (2006.01)
G05D 21/00 (2006.01)

(52) U.S. Cl. ............... 423/239.1; 422/105; 422/129; 422/168; 422/177; 422/187

(58) Field of Classification Search ............ 423/239.1; 422/105, 129, 168, 177, 187
See application file for complete search history.

(56) References Cited

U.S. PATENT DOCUMENTS

| | | | |
|---|---|---|---|
| 4,312,638 | A | 1/1982 | Koump |
| 5,543,124 | A | 8/1996 | Yokota et al. |
| 5,589,142 | A | 12/1996 | Gribbon |
| 5,710,085 | A | 1/1998 | Absil et al. |
| 5,753,192 | A * | 5/1998 | Dobson et al. ............ 422/177 |
| 5,891,409 | A | 4/1999 | Hsiao et al. |
| 5,955,039 | A | 9/1999 | Dowdy |
| 6,420,295 | B1 | 7/2002 | Wu et al. |
| 6,689,709 | B1 | 2/2004 | Tran et al. |
| 7,049,261 | B2 | 5/2006 | Nam et al. |
| 7,105,137 | B2 | 9/2006 | Efstathiou et al. |

(Continued)

FOREIGN PATENT DOCUMENTS

JP  4-341325 A  11/1992

(Continued)

OTHER PUBLICATIONS

O. Maurstad; "An Overview of Coal Based Integrated Gasification Combined Cycle (IGCC) Technology"; MIT publication No. LFEE 2005-002 WP; Sep. 2005; 46 pgs; (http:free.mit.edu/publications); Cambridge, MA.

(Continued)

*Primary Examiner* — Timothy C Vanoy

(57) ABSTRACT

A process and system (18) for reducing $NO_x$ in a gas using hydrogen as a reducing agent is provided. The process comprises contacting the gas stream (29) with a catalyst system (38) comprising sulfated zirconia washcoat particles (41), palladium, a pre-sulfated zirconia binder (44), and a promoter (45) comprising at least one of titanium, zinc, or a mixture thereof. The presence of zinc or titanium increases the resistance of the catalyst system to a sulfur and water-containing gas stream.

20 Claims, 4 Drawing Sheets

U.S. PATENT DOCUMENTS

| | | | |
|---|---|---|---|
| 7,718,153 B2 * | 5/2010 | Sobolevskiy et al. | 423/239.1 |
| 7,744,840 B2 * | 6/2010 | Sobolevskiy et al. | 423/239.1 |
| 2006/0009352 A1 | 1/2006 | Zhao et al. | |
| 2006/0009353 A1 | 1/2006 | Cai et al. | |
| 2007/0110643 A1 | 5/2007 | Sobolevskiy et al. | |
| 2007/0181854 A1 | 8/2007 | Briesch et al. | |
| 2007/0249855 A1 | 10/2007 | Kanner | |
| 2007/0289214 A1 | 12/2007 | Briesch et al. | |
| 2008/0299016 A1 | 12/2008 | Sobolevskiy et al. | |

FOREIGN PATENT DOCUMENTS

| | | |
|---|---|---|
| JP | 2000-342972 A | 12/2000 |
| JP | 2001-162171 A | 6/2001 |
| JP | 2006-289175 A | 10/2006 |

OTHER PUBLICATIONS

A. Fritz, V. Pitchon; "Review The current state of research on automotive lean NOx catalysis"; Applied Catalysis B: Environmental 13 (1997); Oct. 30, 1996; 1-25; 1997 Elsevier Science B.V.

R. Burch, M.D. Coleman; "An investigation of the $NO/H_2/O_2$ reaction on noble-metal catalysts at low temperatures under lean-burn conditions"; Applied Catalysis B: Environmental 23 (1999); May 23, 1999; 115-121; 1999 Elsevier Science B.V.

C. Costa, et al.; :An Investigation of the $NO/H_2/O_2$ (Lean De-NOx) Reaction on a Highly Active and Selective $Pt/La_{0.7}Sr_{0.2}Ce_{0.1}FeO_3$ Catalyst at Low Temperatures; Journal of Catalysis 209; Apr. 23, 2002; 456-471; 2002 Elsevier Science (USA).

C. N. Costa, A. M. Efstathiou; "Low-temperature $H_2$-SCR of NO on a novel $Pt/MgO-CeO_2$ catalyst"; Applied Catalysis B: Environmental 72 (www.sciencedirect.com); Nov. 14, 2006; 240-252; 2006 Elsevier B.V.

M. Machida, S. Ikeda, D. Kurogi, and T. Kijjima; "Low temperature catalytic $NO_x$-$H_2$ reactions over $Pt/TiO_2$-$ZrO_2$ in an excess oxygen"; Applied Catalysis B: Environmental 35; Jul. 13, 2001; 107-116; 2001 Elsevier Science B.V.

* cited by examiner

SELECTIVE CATALYTIC REDUCTION SYSTEM AND PROCESS FOR TREATING NOX EMISSIONS USING A ZINC OR TITANIUM PROMOTED PALLADIUM-ZIRCONIUM CATALYST

CROSS REFERENCE TO RELATED APPLICATIONS

This application is a continuation-in-part of U.S. patent application Ser. No. 12/472,633, filed May 27, 2009, now U.S. Pat. No. 7,744,840, which is a continuation-in-part of U.S. patent application Ser. No. 12/122,116, filed May 16, 2008, now U.S. Pat. No. 7,718,153 the entirety of which is hereby incorporated by reference.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to catalytic processes for the reduction of nitrogen oxides ($NO_x$) in combustion exhaust by selective catalytic reduction (SCR) using hydrogen ($H_2$) as the reducing agent. The present invention also relates to the field of power generation, and more particularly, to the control of $NO_x$ emissions produced during combustion of a fuel containing hydrogen to generate power, and specifically to the catalytic treatment of exhaust gases from a gas turbine at a coal gasification plant. However, the invention may also be employed in $NO_x$ abatement from other sources, such as emissions generated during manufacture of nitric acid, within internal combustion engines and the like.

BACKGROUND OF THE INVENTION

Coal-based integrated gasification combined cycle plant (IGCC) technology enables production of electricity with a gas turbine utilizing a fuel that is rich in hydrogen and has a very limited amount of $CO_2$. Combustion of the hydrogen ($H_2$)-containing fuel requires an oxidizing source such as air, which contains nitrogen ($N_2$). As a result, a by-product in exhaust gas stemming from hydrogen-containing fuel combustion is a significant amount of $NO_x$. The $NO_x$ in the exhaust gas may be reduced by using selective catalytic reduction (SCR) systems along with low $NO_x$ combustors in the gas turbine. Since fuel produced and used at an IGCC plant contains hydrogen ($H_2$), the fuel may also provide hydrogen as a reducing agent in the SCR process by introducing a small amount of $H_2$ from the fuel supply into the SCR system. The use of hydrogen as a $NO_x$ reducing agent enables the elimination of typical reducing agents such as, for example, ammonia ($NH_3$) and urea ($N_2H_6CO$) in the SCR system, and thus prevents discharge of ammonia slip into the ambient air, which is an inherent problem with current ammonia-based SCR technology.

Recently, improvements in $H_2$—SCR efficiency with respect to $NO_x$ removal and $N_2$ selectivity under oxidizing conditions were made in U.S. patent application Ser. Nos. 12/122,116 and 12/472,633, the entirety of each of which is hereby incorporated by reference. As described in U.S. patent application Ser. No. 12/472,633, for example, a palladium (Pd) catalyst comprising pre-sulfated zirconia support particles, palladium, a pre-sulfated zirconia binder, and tungsten (as a promoter) showed a substantial increase in $NO_x$ reduction efficiency and durability over a platinum (Pt) catalyst that was disclosed in U.S. Pat. No. 7,105,137, for example, under gas turbine exhaust conditions. Further improvements in $H_2$—SCR efficiency with respect to $NO_x$ removal and $N_2$ selectivity under oxidizing conditions are needed, as well as improvements in the durability of $H_2$—SCR catalysts.

BRIEF DESCRIPTION OF THE DRAWINGS

The invention is explained in the following description in view of the drawings that show.

DETAILED DESCRIPTION OF THE INVENTION

The present inventors have surprisingly found that the incorporation of titanium or zinc into a Pd-based catalyst system substantially increases the durability of the Pd-based catalyst system when operated in the presence of $SO_2$ and water. Thus, in accordance with an aspect of the present invention, there is provided a process for the selective catalytic reduction of nitrogen oxides ($NO_x$) in a gas stream in the presence of $H_2$ using titanium or zinc. The process comprises contacting the gas stream with a catalyst system comprising sulfated zirconia washcoat particles, palladium, a pre-sulfated zirconia binder, and a promoter comprising at least one of titanium, zinc, or a mixture thereof (titanium and zinc). While not wishing to be bound by theory, it is believed that that the addition of titanium or zinc to the Pd-based catalyst system helps to reduce the oxidation activity of the catalyst system and consequently decreases the oxidation of $H_2$ to water, thereby making greater concentrations of $H_2$ available throughout the length of the catalyst bed for reducing $NO_x$ in the gas stream.

Figure 1:
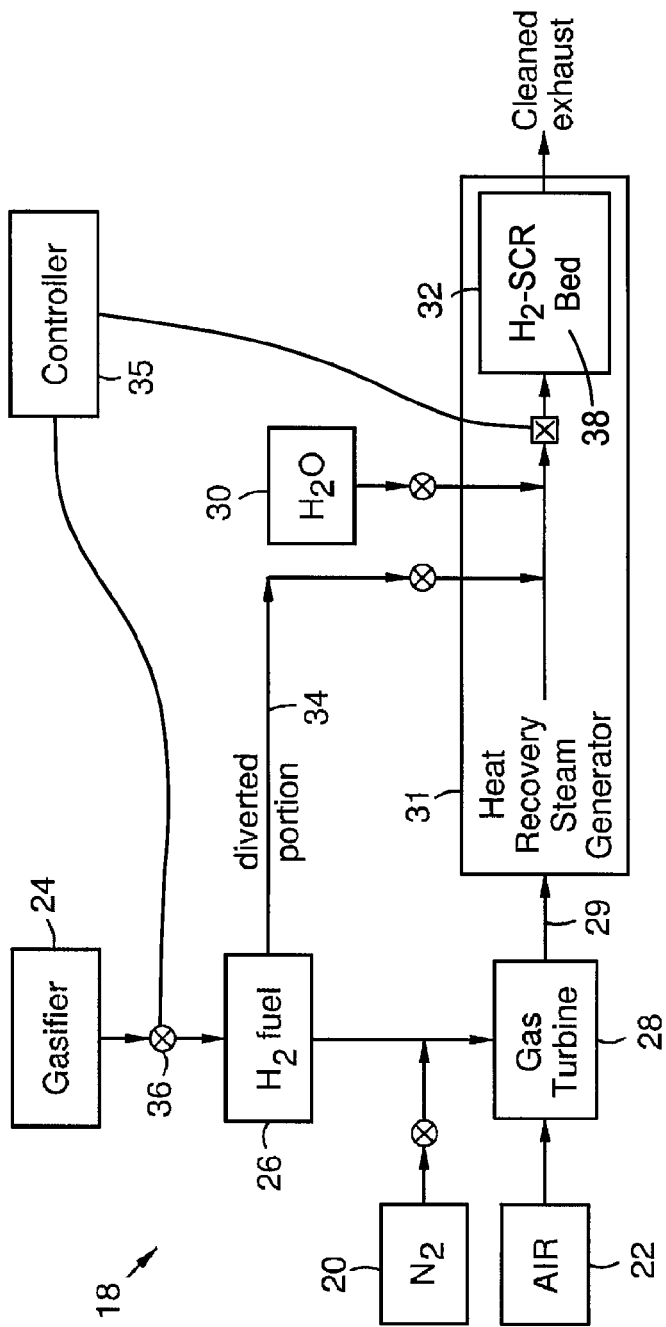
FIG. 1 is a schematic view of an integrated gasification combined cycle power plant in accordance with an aspect of the present invention.

Now referring to the figures, FIG. 1 illustrates an integrated gasification combined cycle power plant system 18 that produces an $H_2$-containing fuel 26 (syngas, or $H_2$-rich fuel after $CO_2$ capture) using a gasification process at gasifier 24. The $H_2$-containing fuel 26 is diluted with nitrogen 20, and combined with air 22 for combustion in a gas turbine 28. In one embodiment, the system 18 or gasifier 24 produces an $H_2$-containing fuel 26 containing at least 10 vol. % $H_2$ and at least 10 vol. % $N_2$. Turbine exhaust gas 29 is directed to a heat recovery steam generator (HRSG) 31, which includes or is otherwise located upstream of a catalyst bed, e.g., an $H_2$ selective catalytic reduction bed ($H_2$—SCR bed) 32, that is positioned at a location suitable for a desired SCR temperature operating range. The exhaust gas 29 passes to the $H_2$—SCR bed 32, where one or more $NO_x$ reduction catalyst layers of the $H_2$—SCR 32 promote the destruction of $NO_x$ by a reducing agent, such as for example $H_2$, producing primarily $N_2$ and $H_2O$. A diverted portion 34 of the $H_2$-containing fuel 26 may be used as a reducing agent for the $NO_x$ reduction reaction in the $H_2$—SCR bed 32. A water injection system 30 may be used to improve $NO_x$ reduction reactions within the $H_2$—SCR bed 32. A controller 35 is connected to sensors and valves 36 to sense and control the process. The $H_2$—SCR bed 32 comprises a catalyst system 38 described in fuller detail below having long-term stability when exposed to an exhaust gas, e.g., exhaust gas 29, having high contents of oxygen, water, and sulfur.

In one embodiment, the $H_2$—SCR bed 32 is in a geometric form that allows for high $NO_x$ reduction efficiency along with a minimal pressure drop. Although beads, extrudates, and the like are suitable geometric forms employed in commercial applications, a monolith is a preferred form. The monolithic form and the use of a monolith as a catalyst carrier are well known to one skilled in the art. A monolith consists of a series of straight, non-interconnecting channels. Onto the walls of the monolith are coated a thin layer of a catalyst-containing material, termed "washcoat" by the trade. It is within the pores of the washcoat that the catalytically active metals, binder, and promoter are located. Thus, in one embodiment, a honeycomb monolith may be washcoated with a catalyst system 38 of the present invention as described herein.

Figure 2:
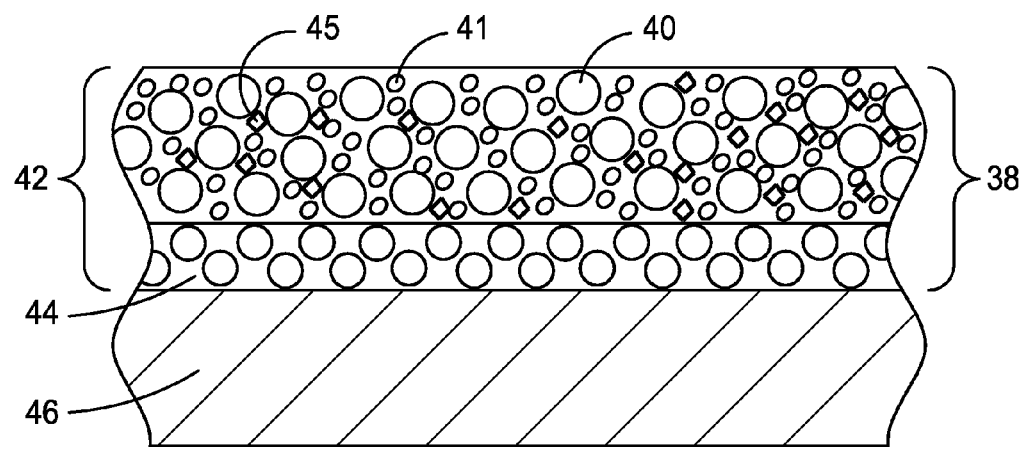
FIG. 2 shows a catalyst system in accordance with an aspect of the present invention.

As shown in FIG. 2, in one embodiment, the catalyst system 38 comprises a washcoat 42 comprising a catalyst 40, washcoat particles 41, a pre-sulfated zirconia binder 44, and a promoter 45. The catalyst 40 is impregnated-within or otherwise associated with the washcoat particles 41. While FIG. 2 depicts the pre-sulfated zirconia binder 44 as a distinct layer for ease of reference, it is understood that the pre-sulfated zirconia binder 44 may be uniformly distributed throughout the washcoat 42. The pre-sulfated zirconia binder 44 enables the washcoat 42 containing the catalyst 40 to be bound to the monolithic substrate 46. Furthermore, the components of the catalyst system 38 may in reality have a more uniform and integrated appearance.

As was shown in U.S. patent application Ser. Nos. 12/122, 116 and 12/472,633, a palladium (Pd) catalyst showed a substantial increase in $NO_x$ reduction efficiency over a platinum (Pt) catalyst disclosed in U.S. Pat. No. 7,105,137, for example, under gas turbine exhaust conditions. It was previously found in U.S. Pat. No. 7,105,137 that platinum (Pt) catalysts with different supports ($Al_2O_3$, $MgO$, $TiO_2$, $CeO_2$, $Y_2O_3$, etc.), have a relatively high selectivity to $N_2O$, which is an undesirable pollutant. Accordingly, in one embodiment of the present invention, the catalyst 40 is a palladium catalyst. Advantageously, the palladium catalyst is not only resistant to water in a process stream, but the water may actually have a positive influence on the palladium catalyst performance in a range of concentrations up to about 25 vol. %, especially between 15-23%, and preferably between 17-21%, with a peak at about 20%. Further increase of water concentrations above about 20% may cause a slight decrease of the catalyst system's performance with respect to $NO_x$ emissions. In one embodiment, a loading of the palladium is from 0.01 to 2% by wt. (wt. %) of the catalyst system 38. Optionally, the catalyst 40 may comprise another suitable catalyst known in the art in conjunction with the palladium catalyst.

The washcoat 42 also comprises sulfated-zirconia washcoat particles 41, which may be sulfated-zirconia or sulfated-zirconia-silica oxides (e.g., $(ZrO_2)SO_4$ or $(ZrO_2—SiO_2)SO_4$). In one embodiment, the washcoat particles 41 comprise $(ZrO_2—SiO_2)SO_4$ particles and the ratio of $SiO_2$ to $ZrO_2$ in the catalyst system 38 is approximately 1:2 by weight. In another embodiment, the washcoat particles 41 comprise $(ZrO_2—SiO_2)SO_4$ particles and a mass ratio of $SiO_2$ to $(ZrO_2+SiO_2)$ in the catalyst system is between 0.05 and 0.90, and in another embodiment is between 0.25 and 0.50. The sulfated washcoat particles 41 may be prepared by the methods set forth in U.S. patent application Ser. No. 12/472,633, for example, which has been incorporated by reference in its entirety herein.

It is understood by one skilled in the art that catalytic materials may diffuse partly into or throughout the substrate to which the washcoat is applied (e.g., a monolith), thus blurring the interface between the washcoat and the substrate. However, "washcoat" is nevertheless a useful term because it indicates a region of catalytic material at the surface of a catalytic bed in which certain percentages by weight apply.

The catalyst system 38 also comprises a pre-sulfated zirconia binder 44. Binders are typically used to adhere the solid catalyst support material to the monolithic substrate. Exemplary conventional binders include clays, aluminas, silicas, zirconias, etc. As set forth in the disclosure of U.S. patent application Ser. No. 12/472,633, the present inventors surprisingly found that the use of a pre-sulfated zirconia binder over conventional binders significantly improves the long-term durability of a Pd-based SCR catalyst system when the catalyst system is used for the reduction of nitrogen oxides ($NO_x$) in a sulfur-containing gas stream. By "pre-sulfated" as used herein, it is meant that the pre-sulfated zirconia binder 44 is incorporated into the catalyst system 38 during preparation and prior to exposing the catalyst system 38 to a flowing sulfur-containing gas stream. Sulfur-containing gas streams include exhaust gases from a gas turbine power generating station at a coal gasification plant (IGCC). Such exhaust gas streams typically comprise $NO_x$, $H_2O$, and $O_2$, as well as $SO_2$. In one embodiment, the pre-sulfated zirconia binder 44 comprises sulfuric acid-treated zirconia or zirconia-silica oxides ($(ZrO_2)SO_4$ or $(ZrO_2—SiO_2)SO_4$). The mass ratio of the pre-sulfated zirconia binder 44 to the catalyst system 38 may be between 0.001 and 0.04 and the atomic S/Zr ratio in the catalyst system 38 may be between 0.01 and 0.15.

In addition, the catalyst system 38 critically comprises a promoter 45, which comprises at least one of titanium, zinc, or a mixture of zinc and titanium. In one embodiment, the promoter 45 may comprise another promoter compound, such as tungsten. The present inventors have found that incorporating promoters, such as zinc or titanium, into a catalyst system in a hydrogen SCR system significantly increases the durability of the catalyst system 38 for reducing $NO_x$ during its exposure to the high concentrations of $SO_2$ and $H_2O$.

In one embodiment, the promoter 45 comprises titanium, typically in the form of a titanium-containing compound. For example, the titanium may be in the form of an oxide of titanium, including but not limited to titanium monoxide (TiO), titanium dioxide ($TiO_2$), titanium trioxide ($Ti_2O_3$), or titanium pentoxide ($Ti_3O_5$). In a particular embodiment, the titanium is in the form of titanium dioxide. Typically, the loading of the titanium in the catalyst system 38 is between 0.5 and 10 wt. % of the catalyst system 38. In a particular embodiment, the loading of the titanium in the catalyst system 38 is between 5 and 7.5 wt %. It is noted that the terms "% mass," "wt %," and "% by wt." are intended to be used interchangeably herein.

In another embodiment, the promoter 45 comprises zinc, typically in the form of a zinc-containing compound. In a particular embodiment, the zinc may be in the form of zinc oxide (ZnO). Typically, the loading of the zinc in the catalyst system 38 is between 0.5 and 12 wt. % of the catalyst system 38. In a particular embodiment, the loading of the zinc in the catalyst system 38 is between 5 and 10 wt %.

In yet another embodiment, the promoter 45 comprises a mixture of titanium and zinc. The ratio of the titanium to zinc may be any desired ratio. In one embodiment, the amount of titanium and zinc may collectively comprise up to 15 wt. % of the catalyst system.

In yet another embodiment, the promoter 45 comprises a mixture of one of titanium, zinc, or a combination of zinc and titanium along with another promoter compound, such as tungsten. In a particular embodiment, the promoter 45 comprises a mixture of tungsten and zinc (e.g., tungsten-containing and zinc-containing compounds). A process for making a tungsten/zinc-containing catalyst system is set forth in Example 4 below. The present inventors have surprisingly found that the particular combination of tungsten and zinc increases the durability of the catalyst system in the presence of sulfur and water relative to conventional catalysts, such as tungsten alone. In this embodiment, the loading of the zinc in the catalyst system 38 may be between 0.5 and 12 wt. % of the catalyst system 38 and a loading of the tungsten may be between 0.5 and 5 wt. % of the catalyst system 38. In a particular embodiment, the loading of the zinc in the zinc/tungsten catalyst system 38 may be between 5 and 10 wt. %.

Turning now to Table 1 below, Table 1 shows a dramatic improvement achieved by utilizing catalyst systems comprising zinc or titanium (as the promoter). The catalyst systems having zinc and titanium were prepared according to the procedures described under Examples 2 and 3 below. The catalyst system comprising tungsten was prepared according to the procedure set forth in U.S. application Ser. No. 12/472,633 and in Example 1. As shown in Table 1 below, the improved catalyst system formulations comprising pre-sulfated zirconia support particles, palladium, a pre-sulfated zirconia binder with zinc (Zn) or titanium (Ti) as promoters (e.g., in the form of their oxides) provide stable operation of the zinc or titanium-containing catalyst systems with $NO_x$ conversion greater than 85% for a longer duration than the same catalyst system with a tungsten (W) promoter alone. Since the testing of durability of the catalytic systems described herein require a significant amount of time to evaluate the catalyst effectiveness, a modified testing procedure was employed. The procedure known as "accelerated aging" was applied to all catalytic system samples by introducing the catalytic blocks into a gaseous stream containing $NO_x$ having an increased (50 ppm) concentration of $SO_2$ along with 20 vol. % of $H_2O$.

TABLE 1

Effects of promoters on the conversion of NOx and the catalyst durability using a Pd/W/(ZrO₂—SiO₂)SO₄, Pd/Zn/(ZrO₂—SiO₂)SO₄ and Pd/Ti/(ZrO₂—SiO₂)SO₄ catalysts.

| Hours of operation | Promoter 5% mas W | Promoter 7.5% mas Ti | Promoter 5% mas Zn |
|---|---|---|---|
| 50 hrs | 92.8% | 95.9% | 92.5% |
| 100 hrs | 93.5% | 94.8% | 96.5% |
| 200 hrs | 96.5% | 96.6% | 95.2% |
| 300 hrs | 92.2% | 91.9% | 93.8% |
| 350 hrs | 81.0% | 91.2% | 92.3% |
| 470 hrs | NA | 90.1% | 92.1% |
| 510 hrs | NA | NA | 85.1% |

$[NO_x]$ = 10 ppm, $[H_2O]$ = 20%, $[SO_2]$ = 50 ppm, NOx/H₂ molar ratio = 80.

As can be seen from the results of Table 1, $H_2$—SCR systems having catalyst systems that include Ti or Zn as promoters are durable far beyond 350 hours of operation with a greater than 85% reduction efficiency of $NO_R$. It was also determined that for the catalyst system 38 having Zn as a promoter 45 increases catalyst durability such that the catalyst system has a $NO_x$ removal efficiency above 85% even beyond 500 hours. Even with greater than 500 hours of exposure, this catalyst system is resistant and not poisoned by the high concentrations of sulfur in the gaseous stream. While not wishing to be bound by any particular theory, it is believed that addition of the promoters Zn, Ti, or W (e.g., in the form of their oxides) help to reduce the oxidation activity of the catalyst (Pd) and consequently decrease the oxidation of $H_2$ to water, thereby making greater concentrations of $H_2$ available for the process throughout the length of the catalyst bed, e.g., catalyst bed 32. As a result, a relatively greater amount of $H_2$ remains available in the reaction zone to facilitate the reduction of $NO_x$ in the presence of $H_2$ to produce $N_2$ and water. In addition, it is believed that the presence of the above-described promoters may inhibit $SO_2/SO_3$ chemisorption on the catalytic support. Since chemisorption of $SO_2/SO_3$ is believed to be stronger than that of $NO_x$, the absence of promoters like Zn, Ti, or W in the catalyst system formulation gradually reduces the catalyst durability due to excessive coverage of the support surface by sulfur species and formation of strong chemical bonds between Pd and sulfur. This phenomenon does not take place when a catalyst system having a pre-sulfated zirconia binder with the addition of promoters, such as Zn and Ti, are utilized.

Figure 3:
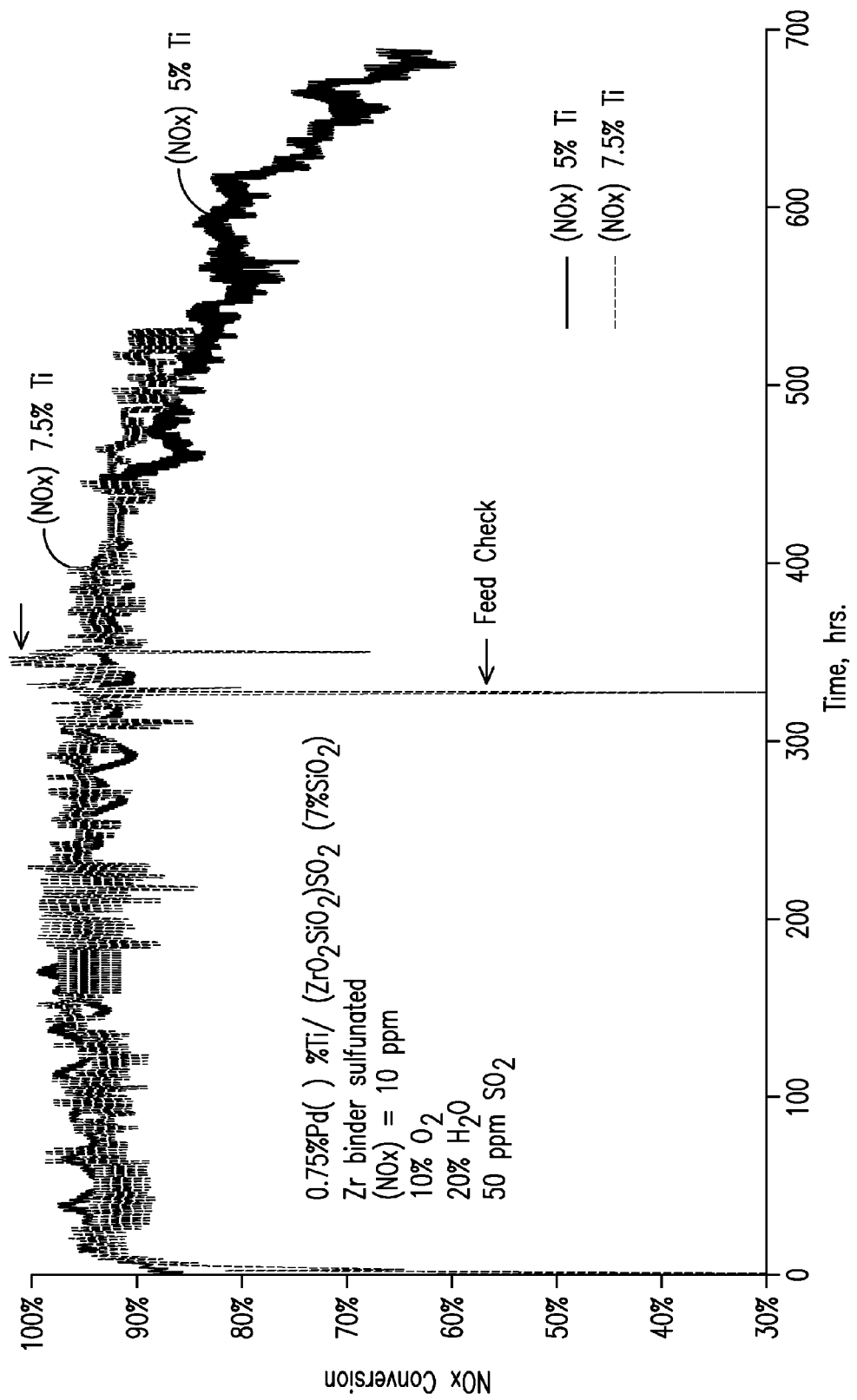
FIG. 3 is a graph showing the effect of concentration changes for titanium in the catalyst system on $NO_x$ reduction efficiency in accordance with an aspect of the present invention.
Figure 4:
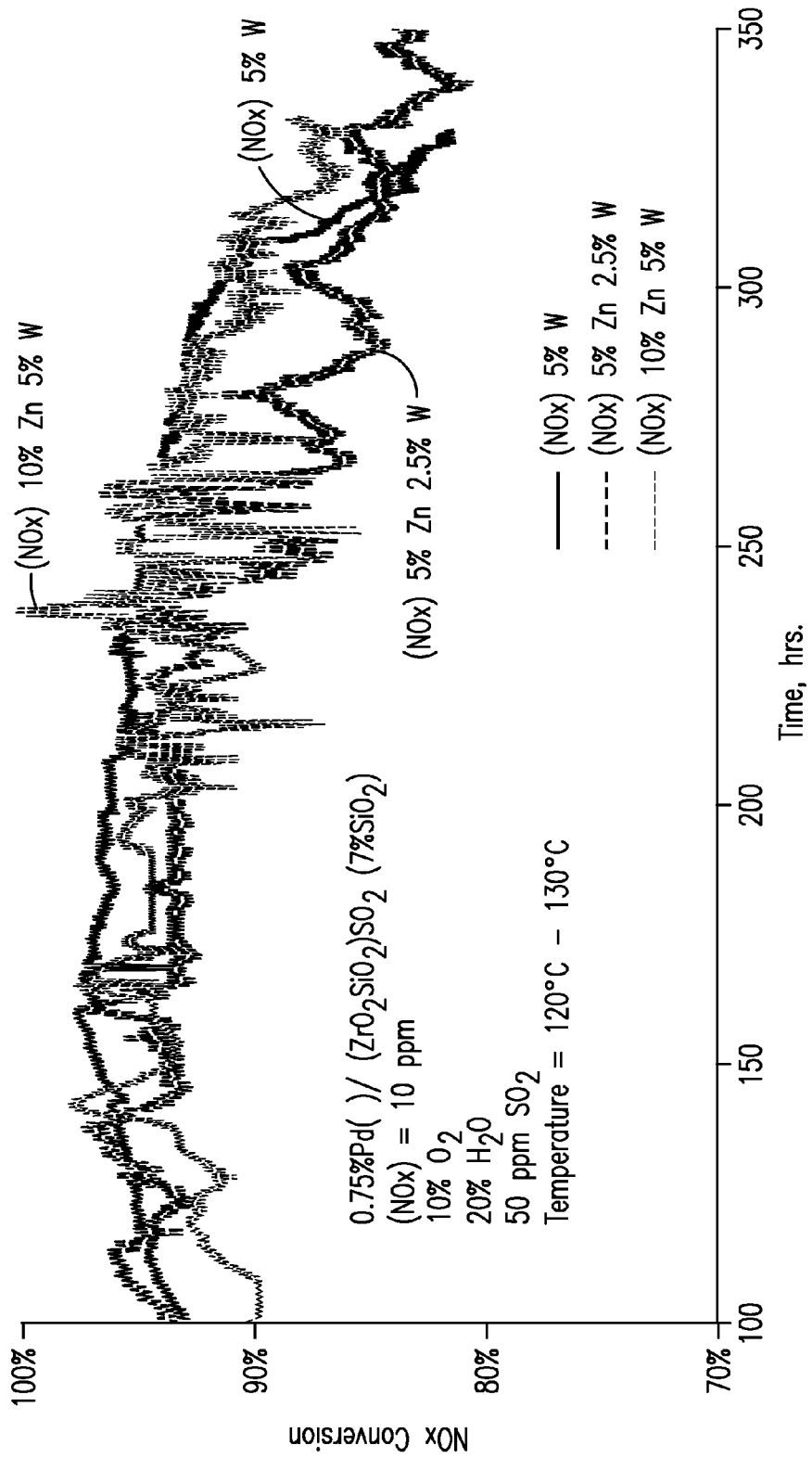
FIG. 4 is graph showing the effect of concentration of a zinc/tungsten promoter in the catalyst system on $NO_x$ reduction efficiency in accordance with an aspect of the present invention.

Referring to FIGS. 3 and 4, these figures show the effect of concentration of titanium (Ti) and zinc (Zn) promoters in the catalyst formulation. FIG. 3 compares the durability of catalytic materials containing 5% Ti and 7.5% Ti by wt. Results are reported for a process stream containing 50 ppm $SO_2$, 10 vol. % $O_2$, 10 ppm $NO_x$, 20 vol. % $H_2O$, a $NOx/H_2$ molar ratio of 80, and balance $N_2$ at a temperature of 120° C. As illustrated in FIG. 3, increasing the titanium loading from 5% to 7.5% by wt. of the catalyst system resulted in a slight improvement in the catalyst system efficiency (for $NO_x$ reduction) at the later stages of operation (e.g., from 400-500 hours). FIG. 4 illustrates the influence of different concentrations of promoters and the specific combination of Zn and W on the durability of the $H_2$—SCR catalyst system developed by the inventors. As can be seen from FIG. 4, the increase of the Zn concentration to 10% by wt. from 5% by wt. in combination with 5% by wt. of W has a slight positive effect on performance and durability of the catalyst system, particularly after 300 hrs, for a process stream containing 50 ppm $SO_2$, 10 vol. % $O_2$, 10 ppm $NO_x$, 20 vol. % $H_2O$, a $NO_x/H_2$ molar ratio of 80, and balance $N_2$ at a temperature of 120° C.

The following description discusses the operation of the above-described catalyst system 38 for removing $NO_x$ from a predetermined gas stream. In one embodiment of a process for the selective catalytic reduction of nitrogen oxides ($NO_x$) in a gas stream in the presence of $H_2$, the process comprises contacting the gas stream with a catalyst system 38 comprising a catalyst 40 (e.g., palladium), washcoat particles 41 (e.g., sulfated zirconia washcoat particles), a pre-sulfated zirconia binder 44, and a promoter 45 comprising at least one of titanium, zinc, or a mixture of titanium and zinc. In a particular embodiment and referring again to FIG. 1, a catalytic bed 32 comprising the catalyst system 38 may be installed in a flow path of an exhaust gas stream 29 of a gas turbine 28 and the exhaust gas stream 29 comprises $NO_x$, $H_2O$, $O_2$, and $SO_2$. For example, the catalytic bed 32 comprising the catalyst system 38 may be installed in the flow path of exhaust gas 29 of the gas turbine 28 in an integrated gasification combined cycle (IGCC) power generation plant system 18 that synthesizes a hydrogen-containing fuel 26 for the gas turbine 28. In this embodiment, the process comprises diverting a portion of the hydrogen-containing fuel 26 to supply the $H_2$ as a $NO_x$ reducing agent for the catalytic bed 32. In addition, the process comprises maintaining a water content 30 in the exhaust gas 29 to a concentration of about 15-25 vol. %, and in one embodiment from 17-20 vol. % and maintaining the diverted portion 34 of the hydrogen-containing fuel 26 into the exhaust gas 29 between the gas turbine 28 and the catalytic bed 32 at a molar ratio for $H_2$/NOx in the range of 10-100 in the exhaust gas 29. In one embodiment, the molar ratio of $H_2$/NOx is from 40-80. Lastly, the process comprises passing the exhaust gas 29 over the catalytic bed 32 at a temperature between 70-250° C. to reduce an amount of $NO_x$ from the exhaust gas 29.

When it is desired to operate the catalyst system 38 at low temperatures, for example at temperatures less than about 200° C., the catalyst 40 (e.g., palladium) may be activated by flowing an oxygen-containing gas over the catalyst 40 (prior to operation) at a temperature sufficient to oxidize any residue (e.g., carbon or carbon-containing compounds) associated with the palladium metal precursor. This is because while calcining the catalyst 40 in the monolithic form, there is little, if any, flow through the channels of the monolith. As a result, the palladium metal precursors are decomposed, but a portion of the decomposition residue still remains on the surface of the catalyst 40, potentially inhibiting the activity of the resulting catalyst during start-up and periods of operation. As a result, the catalyst 40 must be "activated" prior to use by heating to a temperature sufficient to oxidize the residue, thereby removing the residue from the surface of the catalyst 40. Typically, this temperature is greater than about 200° C. The activation temperature is critical because the normal operating temperature of the catalyst 40, typically on the order of 120° C., is not sufficient to readily oxidize this residue.

The catalyst system 38 is very stable with deactivation over extended periods of time, and demonstrates a high $NO_x$ reduction efficiency, even in the presence of up to 50 ppmv of $SO_2$, an $O_2$ content of 1-20 vol. %, an $H_2$/$NO_x$ molar ratio of 10-100, and water up to 25 vol. %. Moreover, the use of a pre-sulfated zirconia binder dramatically improves the durability of the catalyst system 38, which presents an opportunity to achieve high $NO_x$ removal efficiency from $NO_x$-containing gas streams for longer periods of time even in the presence of high amounts of water and sulfur.

Processes using a Ti or Zn-containing catalyst system as described herein provided from 90% to greater than 97% $NO_x$ reduction efficiency in a simulated gas turbine exhaust gas by using hydrogen as a reducing agent in a temperature range of 70° C. to 250° C., preferably between 100-140° C., with a process stream comprising up to 50 ppmv of $SO_2$, an $O_2$ content of 1-20 vol. %, and water up to 25 vol. %. Hydrogen was mixed with the simulated exhaust gas to achieve a molar ratio for $H_2$/$NO_x$ in the simulated exhaust gas of 10 to 100, and preferably about 40 to 80 for optimal $NO_x$ reduction efficiency. In typical applications, the $H_2$/$NO_x$ ratio may depend on several factors that include, but are not limited to, the concentration of $NO_x$ in the process stream, the operating temperature, the exhaust space velocity, and the desired level of $NO_x$ reduction.

Introducing water into the gas stream, e.g., the exhaust gas stream 29, downstream of the gas turbine 28 can improve the $NO_x$ reduction efficiency of the present catalyst 40 should insufficient water (less than about 20 vol. %) be present in the exhaust gas. Thus, water content may be used as an active parameter to increase $NO_x$ removal. For example, steam can be mixed with the $H_2$ stream and injected through an $H_2$ distribution grid upstream of the $H_2$—SCR catalyst bed 32. This configuration also allows for additional water to be added to the process stream when additional water is needed to achieve the target $NO_x$ reduction efficiency. However, there comes a point above about 20% $H_2O$ vol. % when additional water actually causes a decrease in the $NO_x$ removal efficiency. In one embodiment, the range of $H_2O$ is about 15-23 vol. %, and in a particular embodiment, is from about 17-21 vol. %. It is believed that the addition of water into the process stream up to a certain level reduces the $H_2$ oxidation rate according to the LeChatelier's principle. The further increase of water concentration in the exhaust gas beyond 23 vol. % is believed to reduce $NO_x$ removal efficiency due to blockage of some of the active sites.

The temperature of the $H_2$—SCR bed 32 may be maintained in a desirable range by choosing the appropriate location for the $H_2$—SCR bed 32 in the HRSG 31 and by controlling the amount of heat removed by heat exchanged surfaces within the HRSG 31 as is known in the art. The exhaust gas 29 temperature may be further adjusted to the optimum by temperatures and amounts of injected $H_2O$ and diverted hydrogen fuel. A lower boundary of an operational temperature range may be established above a dew point temperature in the exhaust gas stream. The dew point depends upon the concentration of $H_2O$ and other constituents (e.g., $SO_2$/$SO_3$) of the exhaust stream and its pressure. Operation above the dew point will avoid water condensation in the $H_2$—SCR bed 32 and in post-$H_2$—SCR bed 32 areas. This restricts an operation of the $H_2$—SCR at the temperatures below 110-120° C. in some exhaust conditions where high $SO_3$ levels are present.

Although the above invention was described in the context of the power generation field, with specific emphasis on the treatment of gas turbine exhaust, the novel process as described herein may be applied to other $NO_x$ pollution sources, such as for example nitric acid plants and stationary emissions sources, with different system configurations. The below examples are provided to illustrate certain aspects of the present invention and are not intended to be limiting in any respect.

Example 1

This example illustrates a method of synthesis of a Pd-based catalyst supported with pre-sulfated zirconia binder on $ZrO_2$—$SiO_2$ to form a Pd/W/($ZrO_2$—$SiO_2$)$SO_4$ catalyst system with approximately 0.75-1.0 wt. % Pd. To arrive at this catalyst system, 4.5 kg of zirconium hydroxide was added to a 5 gallon pail with 4.5 L of deionized (DI) water and 750 g of a colloidal silica solution (40% $SiO_2$). The pH of the zirconium hydroxide/silica solution was adjusted to about 3.0 with sulfuric acid and mixed overnight. The following morning, the solution was emptied into a pan and placed in an oven to dry at 110° C. to evaporate the excess water. Once dried, the resulting zirconia-silica-sulfate material was crushed below 40-mesh and calcined at 650° C. for 2 hrs.

The washcoat with binder was prepared by adding 21 g of the zirconia-silica-sulfate material, 21 g of a zirconium oxynitrate solution (20% $ZrO_2$), 0.266 g ammonium metatungstate (Aldrich), and 50 mL of DI water to a beaker. Monolith cores (230 cells per square inch (cpsi)) were dipped in the slurry with excess slurry blown from the channels using an air knife. Catalyst cores were calcined at 450° C. for 1 hour. The washcoat loading was approximately 110 g per liter of monolith. After calcining, the cores were cooled and dipped into a solution of 2 g sulfuric acid in 98 g of DI water yielding a 1.98% sulfuric acid loading (2% sulfuric acid per washcoat). Blocks were then dried in a microwave and calcined at 650° C. for 2 hours.

Thereafter, a palladium metal solution was prepared by adding to a beaker: 8.165 g palladium tetraamine chloride solution (8.94-9.35% Pd by weight); 2.2 g TEA (triethanolamine); and sufficient DI water to yield a 100 g total solution weight. The previously dipped monolith blocks were dipped in the solution yielding a 0.78% Pd loading by washcoat (catalyst system) weight. Excess solution was blown from the channels using an air knife. Blocks were dried in a microwave oven for 2-10 minutes and then calcined at 450° C. for 2 hours to decompose the palladium complex.

Example 2

This example illustrates a method of synthesis of a Pd-based catalyst supported with pre-sulfated zirconia binder on $ZrO_2$—$SiO_2$ to form a Pd/Zn/($ZrO_2$—$SiO_2$)$SO_4$ catalyst system with approximately 0.75-1.0 wt. % Pd. To arrive at this catalyst system, 4.5 kg of zirconium hydroxide was added to a 5 gallon pail with 4.5 L of DI water and 750 g of a colloidal silica solution (40% $SiO_2$). The pH of the zirconium silica solution was adjusted to about 3.0 with sulfuric acid (Aldrich) and mixed overnight. The following morning, the solution was emptied into a pan and placed in an oven to dry at 110° C. to evaporate excess water. Once dried, the resulting zirconia-silica-sulfate material was crushed below 40-mesh and calcined at 650° C. for 2 hrs.

The washcoat was prepared by adding 25 g of the zirconium-silica-sulfate material, 25 g of a zirconium oxynitrate solution (20% $ZrO_2$), 1.865 g zinc oxide (diluted in nitric acid) (Aldrich), and 50 mL of DI water to a beaker. Monolith cores (300 cpsi) were dipped in the slurry with excess slurry blown from the channels using an air knife. Catalyst cores were calcined at 450° C. for 1 hour. The washcoat loading was approximately 124 g per liter of monolith. After calcination, the cores were cooled and dipped into a solution of 2.1 g sulfuric acid in 100 g DI water yielding a 2.2% sulfuric acid loading (per washcoat). Blocks were microwaved dry and calcined at 650° C. for 2 hours.

Thereafter, a palladium metal solution was made by adding to a beaker: 9.84 g palladium tetraamine chloride solution (8.94% Pd), 2.6 g TEA (triethanolamine), and sufficient DI water to yield a 100 g total weight solution. The previously dipped monolith blocks were dipped in said solution yielding a 0.96% Pd loading by washcoat weight. Blocks were microwave dried for 2-10 minutes and then calcined at 450° C. for 2 hours.

Example 3

This example illustrates a method of synthesis of a Pd-based catalyst supported with pre-sulfated zirconia binder on $ZrO_2$—$SiO_2$ to form a Pd/Ti/($ZrO_2$—$SiO_2$)$SO_4$ catalyst system with approximately 0.75-1.0 wt. % Pd. To arrive at this catalyst system, 4.5 kg of zirconium hydroxide was added to a 5 gallon pail with 4.5 L of DI water and 750 g of a colloidal silica solution (40% $SiO_2$). The pH of the zirconium silica solution was adjusted to about 3.0 with sulfuric acid (Aldrich) and mixed overnight. The following morning, the solution was emptied into a pan and placed in an oven to dry at 110° C. to evaporate excess water. Once dried, the resulting zirconia-silica-sulfate material was crushed below 40-mesh and calcined at 650° C. for 2 hrs.

The washcoat was prepared by adding 24 g of the zirconium silica sulfate material, 24 g of a zirconium oxynitrate solution (20% $ZrO_2$), 2.0 g titanium dioxide (diluted to 5 ml with a 2% nitric acid solution), and 50 mL of DI water to a beaker. The monolith cores (300 cpsi) were dipped in the slurry to achieve a loading of 176 g/L washcoat. Excess slurry was blown from the channels using an air knife. Catalyst cores were calcined at 450° C. for 1 hour. After calcination, catalyst was cooled and dipped into a solution of 2.1 g sulfuric acid in 100 g DI water yielding a 1.7% sulfuric acid loading (per washcoat). Blocks were microwaved dry and calcined at 450° C. for 2 hours.

Thereafter, a palladium metal solution was made by adding to a beaker: 5.27 g palladium tetraamine chloride solution (8.94% Pd), 1.83 g TEA, and the solution was diluted to 75 g with DI water. The previously dipped monolith blocks were dipped in the palladium metal solution yielding a 0.81% Pd loading by washcoat weight. Blocks were dried in a microwave oven and then calcined at 450° C. for 2 hours.

Example 4

This example illustrates a method of synthesis of a Pd-based catalyst supported with pre-sulfated zirconia binder on $ZrO_2$—$SiO_2$ to form a Pd/Zn/W/($ZrO_2$—$SiO_2$)$SO_4$ catalyst system with approximately 0.75-1.0 wt. % Pd. To arrive at this catalyst system, 4.5 Kg of zirconium hydroxide was added to a 5 gallon pail with 4.5 L of DI water and 750 g of a colloidal silica solution (40% $SiO_2$). The pH of the zirconium silica solution was adjusted to 3.0 with sulfuric acid (Aldrich) and mixed overnight. The following morning, the solution was emptied into a pan and placed in an oven to dry at 110° C. to evaporate excess water. Once dried, the resulting zirconia-silica-sulfate material was crushed below 40-mesh and calcined at 650° C. for 2 hrs.

The washcoat was prepared by adding to a beaker: 25 g of the zirconia-silica-sulfate material, 25 g of a zirconium oxynitrate solution (20% $ZrO_2$), 1.865 g of zinc oxide (diluted to 5 ml with a 2% nitric acid solution), 0.83 g ammonium metatungstate (Aldrich), and 50 mL of DI water. The monolith cores (300 cpsi) were dipped in the slurry to achieve a washcoat loading of 147 g/L of monolith. Catalyst cores were calcined at 450° C. for 1 hour. After calcination, the cores were cooled and dipped into a solution of 2.1 g sulfuric acid in 100 g DI water yielding a 1.9% sulfuric acid loading (per washcoat). Blocks were microwaved dry and calcined at 650° C. for 2 hours.

Thereafter, a palladium metal solution was made by adding to a beaker: 7.215 g palladium chloride solution (8.94% Pd), 2.0 g TEA (Triethanolamine), and sufficient DI water to yield a 75 g total solution weight. The previously dipped monolith blocks were dipped in the palladium metal solution yielding a 0.86% Pd loading by washcoat weight. Blocks were microwaved dry and then calcined at 450° C. for 2 hours.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for selective catalytic reduction of nitrogen oxides ($NO_x$) in a gas stream in the presence of $H_2$, the process comprising:
   contacting the gas stream with a catalyst system comprising sulfated zirconia washcoat particles, palladium, a pre-sulfated zirconia binder, and a promoter comprising at least one of zinc, titanium, or a mixture thereof.

2. The process according to claim 1, wherein the promoter further comprises tungsten, and wherein a loading of the tungsten is between 0.5 and 5 wt. % of the catalyst system.

3. The process according to claim 1, wherein the promoter comprises titanium, and wherein a loading of the titanium is between 0.5 and 10 wt. % of the catalyst system.

4. The process according to claim 3, wherein the promoter comprises titanium, and wherein a loading of the titanium is between 5 and 7.5 wt. %.

5. The process according to claim 1, wherein the promoter comprises zinc, and wherein a loading of the zinc is between 0.5 and 12 wt. % of the catalyst system.

6. The process according to claim 5, wherein the promoter comprises zinc, and wherein a loading of the zinc is between 5 and 10 wt. % of the catalyst system.

7. The process according to claim 1, wherein the promoter further comprises tungsten, wherein the promoter comprises a mixture of tungsten and zinc, wherein a loading of the zinc is between 0.5 and 12 wt. % of the catalyst system, and wherein a loading of the tungsten is between 0.5 and 5 wt. % of the catalyst system.

8. The process according to claim 1, wherein the sulfated zirconia washcoat particles comprise at least one of $(ZrO_2)SO_4$ or $(ZrO_2-SiO_2)SO_4$.

9. The process according to claim 8, wherein the sulfated zirconia washcoat particles comprise $(ZrO_2-SiO_2)SO_4$, and wherein a mass ratio of $SiO_2$ to $(ZrO_2+SiO_2)$ in the catalyst system is between 0.05 and 0.90.

10. The process according to claim 1, wherein a loading of the palladium is from 0.01 to 2% by wt. of the catalyst system.

11. The process according to claim 1, wherein a catalytic bed comprising the catalyst system is installed in a flow path of an exhaust gas stream of a gas turbine, and wherein the exhaust gas stream includes $NO_x$, $H_2O$, $O_2$, and $SO_2$.

12. The process of claim 11, wherein $H_2O$ and hydrogen are injected into the exhaust gas between the gas turbine and the catalytic bed, to a concentration of about 5-25 vol. % $H_2O$ and a molar ratio for $H_2/NO_x$ in the range of 10 to 100 in the exhaust gas.

13. The process of claim 11, wherein the exhaust gas is passed over the catalytic bed at a temperature maintained in a range of 100-140° C.

14. The process of claim 11, wherein the catalytic bed is installed in the flow path of exhaust gas of the gas turbine in an integrated gasification combined cycle (IGCC) power generation plant that synthesizes a hydrogen-containing fuel for the gas turbine, and further comprising:
   diverting a portion of the hydrogen-containing fuel to supply the $H_2$ as a $NO_x$ reducing agent for the catalytic bed;
   maintaining a water content in the exhaust gas to a concentration of about 15-25 vol. % and maintaining the diverted portion of the hydrogen-containing fuel into the exhaust gas between the gas turbine and the catalytic bed at a molar ratio for $H_2/NO_x$ in the range of 10-100 in the exhaust gas; and
   passing the exhaust gas over the catalytic bed at a temperature between 70-250° C. to remove an amount of $NO_x$ from the exhaust gas.

15. The process of claim 14, wherein the water content is maintained to a concentration of about 17-21 vol. %.

16. A system for implementing a process for selective catalytic reduction of nitrogen oxides ($NO_x$) in an exhaust gas from a gas turbine in an integrated gasification combined cycle power plant, comprising:
   a fuel gas synthesizer that produces a fuel gas containing at least 10 vol. % $H_2$ and at least 10 vol. % nitrogen;
   a gas turbine that burns a portion of the fuel gas, producing the exhaust gas;
   a catalytic bed installed in a flow path of the exhaust gas, the catalytic bed comprising a catalyst system, the catalyst system comprising sulfated zirconia washcoat particles, palladium, a pre-sulfated zirconia binder, and a promoter comprising at least one of titanium, zinc, or a mixture thereof;
   a hydrogen injector that mixes a diverted portion of the fuel gas into the exhaust gas between the gas turbine and the catalytic bed;
   an $H_2O$ injector that mixes $H_2O$ into the exhaust gas between the gas turbine and the catalytic bed; and
   sensors and valves at control points in the system connected to a controller that maintains operational conditions in the exhaust gas at the catalytic bed, wherein the operational conditions comprise a temperature between 70-250° C., a molar ratio for $H_2/NO_x$ in the range of 10-100, and $H_2O$ at a concentration of about 15-23 vol. %.

17. The system of claim 16, wherein the promoter comprises titanium, and wherein a loading of the titanium is between 0.5 and 10 wt. % of the catalyst system.

18. The system of claim 16, wherein the promoter comprises zinc, and wherein a loading of the zinc is between 0.5 and 12 wt. % of the catalyst system.

19. The system of claim 16, wherein the promoter further comprises tungsten, wherein the promoter comprises a mixture of tungsten and zinc, wherein a loading of the zinc is between 0.5 and 12 wt. % of the catalyst system, and wherein a loading of the tungsten is between 0.5 and 5 wt. % of the catalyst system.

20. The system of claim 16, wherein the sulfated zirconia washcoat particles comprise at least one of $(ZrO_2)SO_4$ or $(ZrO_2-SiO_2)SO_4$, and wherein a loading of the palladium is from 0.01 to 2% by wt. of the catalyst system.

\* \* \* \* \*